United States Patent Office 3,366,704
Patented Jan. 30, 1968

3,366,704
ETHYLENE POLYMERIZATION TO
HIGHER 1-OLEFINS
Paul R. Stapp, Bartlesville, Okla., assignor to Phillips
Petroleum Company, a corporation of Delaware
No Drawing. Filed Dec. 21, 1964, Ser. No. 420,158
8 Claims. (Cl. 260—683.15)

ABSTRACT OF THE DISCLOSURE

Ethylene is converted to higher 1-olefins, principally straight chain olefins, by contact in a hydrocarbon diluent and at a pressure of at least 50 p.s.i. and not more than 350 p.s.i. above the vapor pressure of the diluent at the reaction temperature, with a product formed by mixing an organolithium compound and at least one compound selected from the group consisting of: (1) rare earth metal chlorides, bromides, and iodides; (2) rare earth metal oxychlorides, oxybromides, and oxyiodides; (3) mixtures of (1) and (2); or (4) mixtures of at least one of (1) and (2) with a rare earth metal oxide wherein the mixture contains at least 5 weight percent halogen.

This invention relates to a new process for the conversion of ethylene to higher, predominantly straight chain 1-olefins. Straight chain olefins containing up to 20 carbon atoms are of particular interest at the present time as a raw material in the production of biodergradable detergents. The present invention is based upon the discovery of a new catalyst for the reaction.

It is therefore the object of this invention to provide a new process for the production of straight chain 1-olefins from ethylene and, further, to minimize coproduction of branched olefins in such a process.

According to the process of this invention, ethylene is converted to higher 1-olefins, principally straight chain olefins, by contact, in a hydrocarbon diluent and at a pressure of at least 50 p.s.i. and not more than 350 p.s.i., preferably not more than 300 p.s.i., above the vapor pressure of the diluent at the reaction temperature, with a product formed by mixing an organolithium compound with at least one compound selected from the group consisting of:

(1) rare earth metal halides,
(2) rare earth metal oxyhalides,
(3) mixtures of (1) and (2), and
(4) mixtures of at least one of (1) and (2) with a rare earth metal oxide wherein the mixture contains at least 5 weight percent halogen.

The rare earth metals whose compounds are to be employed in the process of this invention are those having atomic numbers ranging from 57–71, inclusive, namely lanthanum, cerium, praseodymium, neodymium, promethium, samarium, europium, gadolinium, terbium, dysprosium, holmium, erbium, thulim, ytterbium and lutetium.

As used herein, the halogens present in the halides and oxyhalides are chlorine, bromine and iodine. Thus, the catalyst systems of this invention will comprise an organolithium compound and at least one rare earth metal chloride, bromide, iodide, oxychloride, oxybromide or oxyiodide.

Examples of the rare earth metal compounds are lanthanum bromide, lanthanum chloride, lanthanum iodide, cerous chloride, cerous iodide, praseodymium bromide, praseodymium chloride, neodymium bromide, neodymium chloride, neodymium iodide, promethium chloride, samarium tribromide, samarium trichloride, samarium dichloride, samarium triodide, europium chloride, gadolinium, gadolinium chloride, terbium chloride, dysprosium chloride, holmium chloride, erbium chloride, thulium chloride, ytterbium chloride, lutetium chloride, lanthanum oxybromide, lanthanum oxychloride, lanthanum oxyiodide, cerous oxychloride, ceric oxychloride, cerous oxyiodide, praseodymium oxybromide, praseodymium oxychloride, neodymium oxybromide, neodymium oxychloride, neodymium oxyiodide, promethium oxychloride, samarium oxybromide, samarium oxychloride, samarium oxyiodide, europium oxychloride, gadolinium oxybromide, gadolinium oxychloride, terbium oxychloride, dysprosium oxychloride, holmium oxychloride, erbium oxychloride, thulium oxychloride, ytterium oxychloride, and lutetium oxychloride. Halides of mixtures of rare earths, e.g. didymium, chloride, can be employed if desired.

Of the listed rare earth metal compounds, it is preferred to use chlorides and/or oxychlorides of cerium.

Several of the rare earth metal halides, such as cerium trichloride, are normally obtained commercially in a hydrated form. Prior to utilizing such materials in the process of this invention, the hydrated form should be dehydrated before contacting the material with the organolithium reducing agents. The preferred method for effecting this dehydration is to heat under vacuum, although other methods, such as the treatment of the rare earth metal halide with thionyl chloride, can be employed.

Examples of the oxides include lanthanum oxide, cerous oxide, ceric oxide, praseodymium oxide, neodymium oxide, samarium oxide, europium oxide, gadolinium oxide, terbium oxide, dysprosium oxide, erbium oxide, thulium oxide and ytterbium oxide.

The organolithium compounds which can be used are represented by the formula $RLi_x$ wherein $x$ is an integer of 1 to 4 and R is a hydrocarbon radical selected from the group consisting of aliphatic, cycloaliphatic, and aromatic radicals containing 1 to 20 carbon aotms. Preferred compounds have the formula RLi, wherein R is an alkyl, aryl, cycloalkyl, alkaryl or aralkyl radical containing not more than 10 carbon atoms. Mixed radicals are suitable. Specific examples of RLi compounds include methyllithium,
n-butyllithium,
sec-butyllithium,
tert-butyllithium,
2-butenyllithium,
isooctyllithium,
n-decyllithium,
phenyllithium,
cyclohexyllithium,
2-cyclohexenyllithium,
naphthyllithium,
4-n-butylphenyllithium,
benzyllithium,
4-phenylbutyllithium,
4-phenylhexadecyllithium,
1,4-dilithiobutane,
1,6-dilithiohexane,
1,10-dilithiodecane,
1,20-dilithioeicosane,
1,4-dilithio-2-methyl-2-butene,
1,4-dilithio-2-butene,
dilithionaphthalene,
dilithiomethylnaphthalene,
4,4′-dilithiobiphenyl,
dilithioanthracene,
1,1-dilithio-1,1-diphenylethane,
1,2-dilithio-1,2-diphenylethane,
1,2-dilithiotetraphenylethane,
1,2-dilithio-1-phenyl-1-naphthylethane, 1,2-dilithio-1,2-dinaphthylethane,
1,2-dilithiotrinaphthylethane,
1,4-dilithiocyclohexane,
1,3,5-trilithiocyclohexane,
1-lithio-4-(2-lithiomethylphenyl)butane,
1,2-di(lithiobutyl)benzene,
1,3-dilithio-4-ethylbenzene,
1,5,12-trilithiododecane,
1,4-di(1,2-dilithio-2-phenylethyl)benzene,
1,5-dilithio-3-pentyne,
dilithiophenanthrene,
1,2-dilithiotriphenylethane,
dilithiomethane,
1,4-dilithio-1,1,4,4-tetraphenylbutane,
1,4-dilithio-1,4-diphenyl-1,4-dinaphthylbutane,
1,3,5-trilithiopentane,
2,4,6-trilithiooctane-2,
1,4,8-trilithionaphthalene,
4,8,12-trilithioeicosane,
3,5,9-trilithio-8-phenyltetradecane,
2,4,6-trilithio-1-methylcyclooctane,
2,3,4,5-tetralithiooctane,
2,3,4,5-tetralithiononene-1,
3,5,7,9-tetralithioeicosane,
2,3,7,8-tetralithio-6-n-decylnaphthalene,
2,4,6,8-tetralithiocyclododecane, and the like.

The active catalyst for the conversion of ethylene to higher straight chain 1-olefins is formed by mixing the rare earth metal compound with the $RLi_x$ compound in the presence of a hydrocarbon diluent. Mixtures of two or more rare earth metal compounds and two or more $RLi_x$ compounds can be used. The components generally react at room temperature, but elevated temperatures can be employed. The catalyst can be formed outside the vessel in which ethylene is converted to a higher 1-olefin and subsequently charged thereto, or the catalyst can be formed directly in the reaction vessel to which ethylene is to be charged.

The diluent employed during catalyst preparation is normally the same diluent which is used when the catalyst is contacted with ethylene. However, different diluents can be used in these two steps. Suitable diluents include hydrocarbons such as heptane, hexane, octane, benzene, toluene, xylene, decalin, cyclohexane, cyclooctane, methylcyclohexane, and the like.

The polymerization is carried out at a temperature of from about 160 to 300° C. preferably from 175 to 225° C. at a pressure generally ranging from 100 to 1000 p.s.i.g., preferably from 300 to 500 p.s.i.g. As described above, the pressure employed should be at least 50 p.s.i. above, not more than 350 p.s.i. above, and preferably not more than 300 p.s.i. above, the vapor pressure of the diluent at the reaction temperature. If higher pressures are employed, higher concentrations of ethylene will be present in the reaction zone, and this will lead to increased formation of solid ethylene polymer.

The amount of hydrocarbon diluent present in the reactor generally ranges from 50 to 500 cc. per liter of polymerization reactor capacity. The amount of diluent present during catalyst preparation, if a separate step is used, generally ranges from 10 to 100 volume percent of the amount used in the ethylene conversion step. The amount of rare earth metal component present ranges from 10 to 100 millimoles per liter of reactor capacity, while the mol ratio of RLi/rare earth metal compound generally ranges from 0.5/1 to 10/1.

The polymerization can be carried out batchwise or continuous, and reaction times can vary from a few minutes to several hours. Inert supports for the rare earth metal compounds can be used, e.g., alumina, silica, silica/alumina, kieselguhr, etc.

The following specific example clearly shows that the catalyst system of this invention provides a new means for converting ethylene to higher 1-olefins of the straight chain variety. The example should not be considered unduly limiting.

EXAMPLE

A series of runs was carried out in which the reaction product of cerous chloride ($CeCl_3$) and butyllithium was employed for the conversion of ethylene to higher 1-olefins.

In each of these runs, the n-butyllithium and the cerous chloride were charged to a 1-liter autoclave along with 200 ml. of diluent and heated to a temperature in the range 100 to 225° C. in the absence of ethylene, after which ethylene was pressured into the reactor to a pressure in the range 175 to 500 p.s.i.g. The addition of ethylene was continued on an open valve to maintain the pressure at the initial pressure, and each run was carried out for a time of 3.25 to 4.0 hours. The reactor was then cooled and vented, the reactor effluent removed and hydrolyzed with dilute aqueous hydrochloric of sulfuric acid, the solid polymer recovered (if any present) by pouring into methanol and filtering, and the higher 1-olefins present analyzed by vapor phase chromatography. The cerous chloride used in these runs had been dehydrated by heating under a pressure of 1 mm. Hg absolute for 4 hours at 80 to 100° C., 4 hours at 100 to 200° C., and 8 hours at 240 to 250°. The butyllithium used in these runs was charged as a 1.56 molar solution in hexane. Results are shown in the following table.

| Run | Diluent | Diluent, ml. | Millimoles, $CeCl_3$ | Millimoles, BuLi | Temp., °C. | Ethylene Pressure, p.s.i. | Pressure above vapor press. of diluent, p.s.i. | Reaction Time, hrs. | Results |
|---|---|---|---|---|---|---|---|---|---|
| 1 | Xylene | 200 | 40 | 120 | 175 | 150-175 | 130-145 | 3.25 | Small amount solid polymer, more liquid. |
| 2 | Benzene | 200 | 40 | 120 | 200 | 375 | 118 | 4 | 17.3 ml. 1-olefins ($C_{10}$ to $C_{20}$). |
| 3 | do | 200 | 40 | 120 | 200 | 500 | 243 | 4 | 80 grams solid, 41 ml. 1-olefins ($C_{10}$ to $C_{20}$). |
| 4 | do | 200 | 40 | 120 | 225 | 375 | 98 | 4 | 75 grams liquid olefins. |
| 5 | do | 200 | 40 | 60 | 225 | 375 | 98 | 4 | Liquid 1-olefins similar to Run 4. |
| 6 | do | 200 | 40 | 120 | 150 | 450-500 | 379-429 | 4 | 118 grams solid polymer (dry). |

In Run 1 vapor phase chromatographic analysis (VPC) of the liquid product showed the presence of 1-hexene, 1-octene and 1-dodecene.

The reactor effluent from Run 2 was analyzed by VPC and found to contain olefins up through $C_{20}$. Fractionation of the reactor effluent yielded three fractions:

| Fraction | Volume, ml. | Boiling Range |
|---|---|---|
| 1 | 60 | 25-70° C. at atm. |
| 2 | 5.3 | 27-98° C. at 40-20 mm. Hg. |
| 3 | 12.0 | 89-100° C. at 20-2 mm. Hg. |

A sample of fraction 3 was hydrogenated and then analyzed by VPC and found to be over 90 percent by weight staright chain hydrocarbon. Infrared analysis of fraction 3 showed predominantly 1-olefins with small amounts of internal trans olefins present.

Distillation of the liquid product from Run 3 gave 15 ml. of olefins boiling at 26–74° C. at 22 mm. Hg and 26 ml. of olefins boiling at 85–175° C. at 15–2 mm. Hg.

The liquid product from Run 4 contained less $C_{12}$ and higher olefins than in Run 2, but analysis indicated a higher percentage of branched materials were produced. This indicates that higher temperatures cause more branching to occur. Run 5 illustrates polymerization substantially like Run 4 but at a different catalyst ratio. Run 6 shows that low temperatures should be avoided as well as excessive pressure when liquid products are desired.

Various modifications and alterations of this invention will become apparent to those skilled in the art without departing from the scope and spirit of the invention, and it should be understood that the latter is not necessarily limited to the aforementioned discussion.

That which is claimed is:

1. A process of converting ethylene to higher predominantly straight chain 1-olefins comprising contacting ethylene in hydrocarbon diluent with a rare earth metal-organolithium catalyst which forms on mixing (a) at least one compound selected from the group consisting of:

(1) rare earth metal chloride, bromides, and iodides,
    (2) rare earth metal oxychlorides, oxybromides, and oxyiodides,
    (3) mixtures of (1) and (2), and
    (4) mixtures of at least one of (1) and (2) with a rare earth metal oxide, wherein the mixture contains at least 5 weight percent halogen; and (b) at least one organolithium compound of the formula $RLi_x$ where $x$ is an integer from 1 to 4 and R is a hydrocarbon radical selected from the group consisting of aliphatic, cycloaliphatic and aromatic radicals containing not more than 20 carbon atoms, at a pressure at least 50 but not more than 350 p.s.i. above the vapor pressure of the diluent at the reaction temperature and the mole ratio of said organolithium compound to rare earth metal component being from 0.5/1 to 10/1.

2. A process of converting ethylene to higher predominantly straight chain 1-olefins comprising contacting ethylene in hydrocarbon diluent with a rare earth metal-organolithium catalyst which forms on mixing (a) at least one compound selected from the group consisting of:

(1) rare earth metal halides,
    (2) rare earth metal oxyhalides,
    (3) mixtures of (1) and (2), and
    (4) mixtures of at least one of (1) and (2) with a rare earth metal oxide, wherein the mixture contains at least 5 weight percent halogen, and (b) at least one compound of the formula RLi wherein R is selected from the group consisting of alkyl, aryl, cycloalkyl, aralkyl and alkaryl radicals containing not more than 10 carbon atoms at a pressure at least 50 but not more than 350 p.s.i. above the vapor pressure of the diluent at the reaction temperature and the mole ratio of said organolithium compound to rare earth metal component being from 0.5/1 to 10/1.

3. The process of claim 2 wherein said contacting is carried out at 160 to 300° C. at a pressure of 100 to 1000 p.s.i.g.

4. The process of claim 3 wherein the amount of rare earth metal component is in the range of 10 to 100 millimoles per liter of reactor capacity.

5. A process of converting ethylene to higher predominantly straight chain 1-olefins containing 6 to 20 carbon atoms comprising contacting ethylene in an aromatic hydrocarbon diluent with a catalyst which forms on mixing cerous chloride and butyllithium at a pressure at least 50 but not more than 300 p.s.i. above the vapor pressure of the diluent at the reaction temperature.

6. The process of claim 5 wherein said diluent is selected from the group consisting of xylene and benzene.

7. A process for polymerizing ethylene to higher predominantly straight chain 1-olefins containing up to 20 carbon atoms comprising contacting ethylene in aromatic hydrocarbon diluent at a temperature of 160 to 300° C. and at a pressure at least 50 p.s.i. and not more than 300 p.s.i. above the vapor pressure of the diluent at the reaction temperature with a catalyst which forms on mixing butyllithium and cerous chloride, said catalyst components having been mixed in the absence of ethylene and heated to a temperature of 100 to 225° C.

8. The process of claim 7 wherein the amount of cerous chloride is 10–100 millimoles per liter of reactor capacity and the mole ratio of butyllithium to cerous chloride is in the range of 0.5/1 to 10/1.

References Cited
UNITED STATES PATENTS

| | | | |
|---|---|---|---|
| 2,921,060 | 1/1960 | Stuart | 252—429 |
| 2,953,531 | 9/1960 | Anderson et al. | 260—94.9 X |
| 3,056,770 | 10/1962 | D'Alelio | 260—94.9 X |
| 3,111,511 | 11/1963 | Stickney | 252—429 X |
| 3,125,559 | 3/1964 | Shokal et al. | 260—94.9 X |
| 3,179,647 | 4/1965 | Mulley et al. | 260—94.9 |

PAUL M. COUGHLAN, JR., *Primary Examiner.*

UNITED STATES PATENT OFFICE
CERTIFICATE OF CORRECTION

Patent No. 3,366,704  January 30, 1968

Paul R. Stapp

It is hereby certified that error appears in the above numbered patent requiring correction and that the said Letters Patent should read as corrected below.

Column 5, line 25, for "chloride" read -- chlorides --; line 47, for "halides" read -- chlorides, bromides, and iodides --; line 48, for "oxyhalides" read -- oxychlorides, oxybromides, and oxyiodides --.

Signed and sealed this 3rd day of June 1969.

(SEAL)
Attest:

Edward M. Fletcher, Jr.
Attesting Officer

Commissioner of Patents